(12) United States Patent
Bantukul et al.

(10) Patent No.: US 7,110,780 B2
(45) Date of Patent: Sep. 19, 2006

(54) METHODS AND SYSTEMS FOR AUTOMATICALLY BYPASSING SHORT MESSAGE SERVICE CENTER FOR SHORT MESSAGE SERVICE (SMS) MESSAGES DESTINED FOR PREDETERMINED SHORT MESSAGE PEER-TO-PEER (SMPP) DESTINATIONS

(75) Inventors: Apirux Bantukul, Cary, NC (US); Venkataramaiah Ravishankar, Cary, NC (US)

(73) Assignee: Tekelec, Calabasas, CA (US)

( * ) Notice: Subject to any disclaimer, the term of this patent is extended or adjusted under 35 U.S.C. 154(b) by 188 days.

(21) Appl. No.: 11/052,440

(22) Filed: Feb. 7, 2005

(65) Prior Publication Data

US 2005/0176450 A1 Aug. 11, 2005

Related U.S. Application Data

(60) Provisional application No. 60/542,503, filed on Feb. 6, 2004.

(51) Int. Cl.
*H04Q 7/20* (2006.01)
(52) U.S. Cl. ............... 455/466; 455/445; 370/352
(58) Field of Classification Search ............. 455/466, 455/412.1, 426.1, 412.2, 445, 458; 709/203, 709/206; 370/352
See application file for complete search history.

(56) References Cited

U.S. PATENT DOCUMENTS

| | | | |
|---|---|---|---|
| 2001/0041579 A1* | 11/2001 | Smith et al. | 455/466 |
| 2002/0019243 A1* | 2/2002 | Zhang et al. | 455/466 |
| 2003/0003932 A1* | 1/2003 | Corrigan et al. | 455/466 |
| 2003/0199282 A1* | 10/2003 | Marcjan et al. | 455/466 |
| 2003/0211856 A1* | 11/2003 | Zilliacus | 455/466 |
| 2004/0259531 A1* | 12/2004 | Wood et al. | 455/412.1 |
| 2005/0070314 A1* | 3/2005 | Wilson | 455/466 |

OTHER PUBLICATIONS

"Short Message Peer-to-Peer Protocol Specification," www.smsforum.net, Version 5.0, pp. 1-166 (Feb. 2003).
Notification of Transmittal of the International Search Report and the Right Opinion of the International Searching Authority, of the Declaration in International Application No. PCT/US05/03901 (Sep. 20. 2005).
"Cisco IP Transfer Point as the Signaling Gateway for the Cisco BTS 10200 Softswitch," Cisco Systems, Inc., pp. 1-10 (Summer 2004).
"Cisco IP Transfer Point as the Signaling Gateway for the Cisco PGW 2200 Softswitch," Cisco Systems, Inc., pp. 1-11 (Summer 2004).
"Next-Generation Signaling Transports Cisco IP Transfer Point," Cisco Systems, Inc., pp. 1-27 (Summer 2004).
"A Study in Mobile Messaging: The Evolution of Messaging in Mobile Networks, and How to Efficiently and Effectively Manage the Growing Messaging Traffic," White Paper, Cisco Systems, Inc., pp. 1-6 (Spring 2004).

(Continued)

*Primary Examiner*—William Trost
*Assistant Examiner*—Brandon J. Miller
(74) *Attorney, Agent, or Firm*—Jenkins, Wilson & Taylor, P.A.

(57) ABSTRACT

Methods and systems for automatically bypassing a short message service center for short message service (SMS) messages destined for predetermined SMPP destinations are disclosed. A signal transfer point may receive SMS messages that are global title addressed to a short message service center. The signal transfer point may internally route such messages to a short message gateway. The short message gateway may identify SMS messages destined for predetermined SMPP destinations and forward those messages to the destinations in a manner that bypasses the SMSC. For other SMS messages, the short message gateway may forward these messages to the SMSC for delivery.

30 Claims, 8 Drawing Sheets

OTHER PUBLICATIONS

Walker, "The IP Revolution in Mobile Messaging," PACKET, Cisco Systems Users Magazine, vol. 16, No. 1, pp. Cover; 73-74; and 89 (First Quarter 2004).

"Cisco ITP Multilayer Routing (MLR) SMS MO Routing Requirements," Cisco Systems, Inc., p. 1 (Copyright 2004).

"Cisco Signaling Gateway Manager Release 3.2 For Cisco IP Transfer Point," Cisco Systems, Inc., pp. 1-9 (Copyright 1992-2004).

"Solutions for Mobile Network Operators," Cisco Systems, Inc., pp. 1-8 (Copyright 1992-2004).

Moodie, "Agilent acceSS7: White Paper," Agilent Technologies, pp. 1-14 (Apr. 1, 2003).

"Cisco IP Transfer Point," Cisco Systems, Inc., pp. 1-10 (Copyright 1992-2003).

"Cisco IP Transfer Point Multilayer Short Message Service Routing Solution," Cisco Systems, Inc., pp. 1-6 (Copyright 1992-2003).

"Cisco ITP MAP Gateway for Public WLAN SIM Authentication and Authorization," Cisco Systems, Inc., pp. 1-13 (Copyright 1992-2003).

Barry, "A Signal for Savings," PACKET, Cisco Systems Users Magazine, vol. 14, No. 4, pp. Cover; 19-21; and 81 (Fourth Quarter 2002).

"Agilent Technologies and Cisco Systems SS7 over IP White Paper," Cisco Systems, Inc. and Agilent Technologies, pp. 1-6 (Copyright 2002 - Printed in the UK Feb. 1, 2002).

"Cisco IP Transfer Point: MTP3 User Adaptation (M3UA) and SCCP User Adaptation (SUA) Signaling Gateway," Cisco Systems, Inc., pp. 1-14 (Copyright 2002).

"Cisco SS7 Port Adapter for the Cisco 7500 Versatile Interface Processor and 7200 VXR Routers Provide High-Density SS7 Aggregation," Cisco Systems, Inc., pp. 1-5 (Copyright 1992-2002).

"Next-Generation SS7 Networks with the Cisco IP Transfer Point," Cisco Systems, Inc., pp. 1-14 (Copyright 1992-2002).

"Agilent acceSS7 Business Intelligence," Agilent Technologies, pp. 1-6 (Copyright 2001 - Printed in the UK Nov. 30, 2001).

"Cisco IP Transfer Point (ITP) Network Management Product Presentation," Cisco Systems, Inc., pp. 1-20 (Copyright 2001).

"Networkers," Cisco Systems, Inc., pp. 1-60 (Copyright 2001).

"Cisco SS7 Signaling Offload," Cisco Systems, Inc., pp. 1-33 (Copyright 1992-2001).

"Topsail Beach - SS7 Over IP" Cisco Systems, Inc. pp. 1-16 (Copyright 1999).

"Chapter 1: Overview," SS7 Port Adapter Installation and Configuration, pp. 1-1 - 1-8 (Publication Date Unknown).

"Configuring ITP Basic Functionality," IP Transfer Point, Cisco IOS Release 12.2(4)MB12, pp. 31-50 (Publication Date Unknown).

"Configuring ITP Optional Features," IP Transfer Point, Cisco IOS Release 12.2(4)MB12, pp. 65-136 (Publication Date Unknown).

"Configuring M3UA and SUA SS7 Over IP Signaling Gateways," IP Transfer Point, Cisco IOS Release 12.2(4)MB13, pp. 51-66 (Publication Date Unknown).

"Configuring M3UA and SUA SS7 Over IP Signaling Gateways," IP Transfer Point, Cisco IOS Release 12.2(4)MB10, pp. 49-62 (Publication Date Unknown).

* cited by examiner

METHODS AND SYSTEMS FOR AUTOMATICALLY BYPASSING SHORT MESSAGE SERVICE CENTER FOR SHORT MESSAGE SERVICE (SMS) MESSAGES DESTINED FOR PREDETERMINED SHORT MESSAGE PEER-TO-PEER (SMPP) DESTINATIONS

RELATED APPLICATIONS

This application claims the benefit of U.S. Provisional Patent Application Ser. No. 60/542,503, filed Feb. 6, 2004; the disclosure of which is incorporated herein by reference in its entirety.

TECHNICAL FIELD

The present invention relates to methods and systems for processing SMS messages. More particularly, the present invention relates to bypassing a short message service center for SMS messages destined for predetermined SMPP destinations.

BACKGROUND ART

In mobile communications networks, it is now possible to send short text messages, referred to as short messages or short message service (SMS) messages, using mobile handsets. Some SMS messages may be sent from mobile handsets to other mobile handsets. Such SMS messages are referred to as mobile-terminated SMS messages. Other SMS messages are intended for non-handset destinations, such as machine destinations. An example of a machine destination is a voting machine that accepts SMS messages to tally votes for a one-time event, such as a contest.

The entity in the network that is responsible for delivering SMS messages to their destinations is the short message service center (SMSC). For mobile terminated SMS messages, the SMSC must query the destination subscriber's home location register to identify the MSC currently serving the subscriber and deliver the message to the subscriber via the MSC. If the subscriber is unavailable, the SMSC must store the message until the subscriber becomes available. For machine destinations, since these destinations are usually always available and in fixed locations, the SMSC simply delivers the SMS messages to such destinations. Another responsibility of the SMSC is to communicate with SS7 network elements via the SS7 protocol and to communicate with short message peer-to-peer (SMPP) entities via the SMPP protocol.

FIG. 1 illustrates a conventional telecommunications network including an SMSC 100, a signal transfer point (STP) 102, a mobile switching center (MSC) 104, a machine destination 106, and a mobile destination 108. For all mobile originated SMS messages, mobile switching center 104 sends the messages to STP 102. The messages are sent route on global title, and the global title addresses in the messages are set to the global title address of SMSC 100. The global title address of the SMSC is programmed into the mobile handsets of all users of SMSC 100. This parameter is sent automatically when a mobile subscriber originates an SMS message. STP 102 global title translates the mobile originated SMS traffic and routes the traffic to SMSC 100. It should be noted that all mobile originated SMS traffic with a global title address equal to that of the SMSC is sent to the SMSC regardless of whether the traffic is intended for a machine destination 106 or a mobile destination 108. When SMSC 100 receives the messages, SMSC 100 formulates SMPP messages and sends the SMPP messages to the appropriate destination.

Mobile telecommunications service providers must engineer their networks to have sufficient SMSC capacity to handle the SMS traffic in their networks. FIG. 2 is a graph illustrating SMS traffic versus time in a typical telecommunications network. In FIG. 2, the line 200 represents the baseline level of SMS traffic. Peak 202 represents a spike in SMS traffic caused by a flood of SMS messages sent through the service provider's network, for example, due to a voting event or spam SMS traffic. In order to engineer the network to handle both the normal traffic level and sporadically occurring peaks in traffic level, the service provider would be required to over-provision short message service centers in the network. However, since certain peak SMS traffic may be addressed to machine destinations or other destinations that are stationary and always on, there is no need to provide full SMSC functionality for such destinations. As a result, networks are either unable to handle peak SMS message traffic or are over-engineered.

Accordingly, there exists a long felt need for methods and systems for bypassing a short message service center for SMS messages destined for predetermined SMPP destinations.

DISCLOSURE OF THE INVENTION

The present invention includes methods and systems for bypassing a short message service center for SMS messages directed to predetermined destinations. According to one method, SMS messages that are global title addressed to an SMSC are intercepted and routed to a short message gateway. The short message gateway identifies messages that are addressed to predetermined destinations, such as machine destinations. For these messages, the short message gateway determines the destination address and formulates SMPP messages. The short message gateway then sends the SMPP messages to the SMPP destinations, bypassing the short message service center. Because the short message service center is bypassed for messages that are the cause of most traffic peaks, there is no need to over-engineer the SMSC capacity in the network.

One particular class of traffic for which it may be desirable to bypass the SMSC includes messages addressed to short codes. In SMS networks, short codes are assigned by a national short code administrator. Translations from short codes to SMPP addresses are distributed to service providers in a manner similar to number portability databases. Short codes consist of short alphanumeric codes that identify SMPP destinations. In order to send a message to a short code, a mobile subscriber simply types an SMS message in his or her mobile handset and hits send or call. The handset then prompts the mobile subscriber for the destination number. The mobile subscriber inputs the short code for the destination number. The message is then sent to the intended SMPP destination.

According to the present invention, rather than routing such messages directed to short codes to an SMSC for delivery, such messages are sent to an STP and diverted to a short message gateway that bypasses the SMSC. Other SMS messages, such as mobile terminated SMS messages, may be routed through the SMSC as normal. Because messages addressed to certain destination types can bypass the SMSC, the need to over-engineer the SMSC capacity in a network is reduced.

The present invention is not limited to bypassing the SMSC only for messages directed to short codes. Bypassing the SMSC for any type of traffic that a user desires to program in the short message gateway is intended to be within the scope of the invention. For example, it may be desirable to bypass the SMSC for all traffic destined for machine destinations that are stationary and always on or any other destination for which storing and forwarding is not required. It may also be desirable to bypass the SMSC for any types of SMS messages, such as advertisements or spam, that lead to spikes in SMS traffic.

Thus, one aspect of the subject matter described herein includes a method for bypassing a short message service center for short message service messages intended for predetermined destinations. The method includes receiving message service (SMS) message traffic that is global title addressed to a short message service center (SMSC). SMS messages that are destined for a predetermined short message peer-to-peer (SMPP) destination are identified. These messages are routed to the predetermined SMPP destination in a manner that bypasses the SMSC. SMS messages of the SMS traffic that are not destined for the predetermined SMPP destination are identified and sent to the SMSC.

The term "SMS message," as used herein, refers to SMS content that may be carried in any type of signaling message, including an SS7 signaling message or an IP telephony signaling message. As described above, SMS messages destined for predetermined SMPP destinations are routed to the destinations in a manner that bypasses the SMSC. Routing the SMS messages to the SMPP destinations may include formulating an SMPP message, extracting an SMS message from a signaling message, and forwarding the SMPP message to the predetermined SMPP destination.

Accordingly, it is an object of the invention to provide methods and systems for bypassing a short message service center for SMS messages destined for predetermined destinations.

It is another object of the invention to provide methods and systems for routing short code SMS traffic to an SMPP destination without impacting an SMSC.

Some of the objects of the invention having been stated hereinabove, and which are addressed in whole or in part by the present invention, other objects will become evident as the description proceeds when taken in connection with the accompanying drawings as best described hereinbelow.

BRIEF DESCRIPTION OF THE DRAWINGS

Preferred embodiments of the invention will now be explained with reference to the accompanying drawings of which.

DETAILED DESCRIPTION OF THE INVENTION

Figure 3:
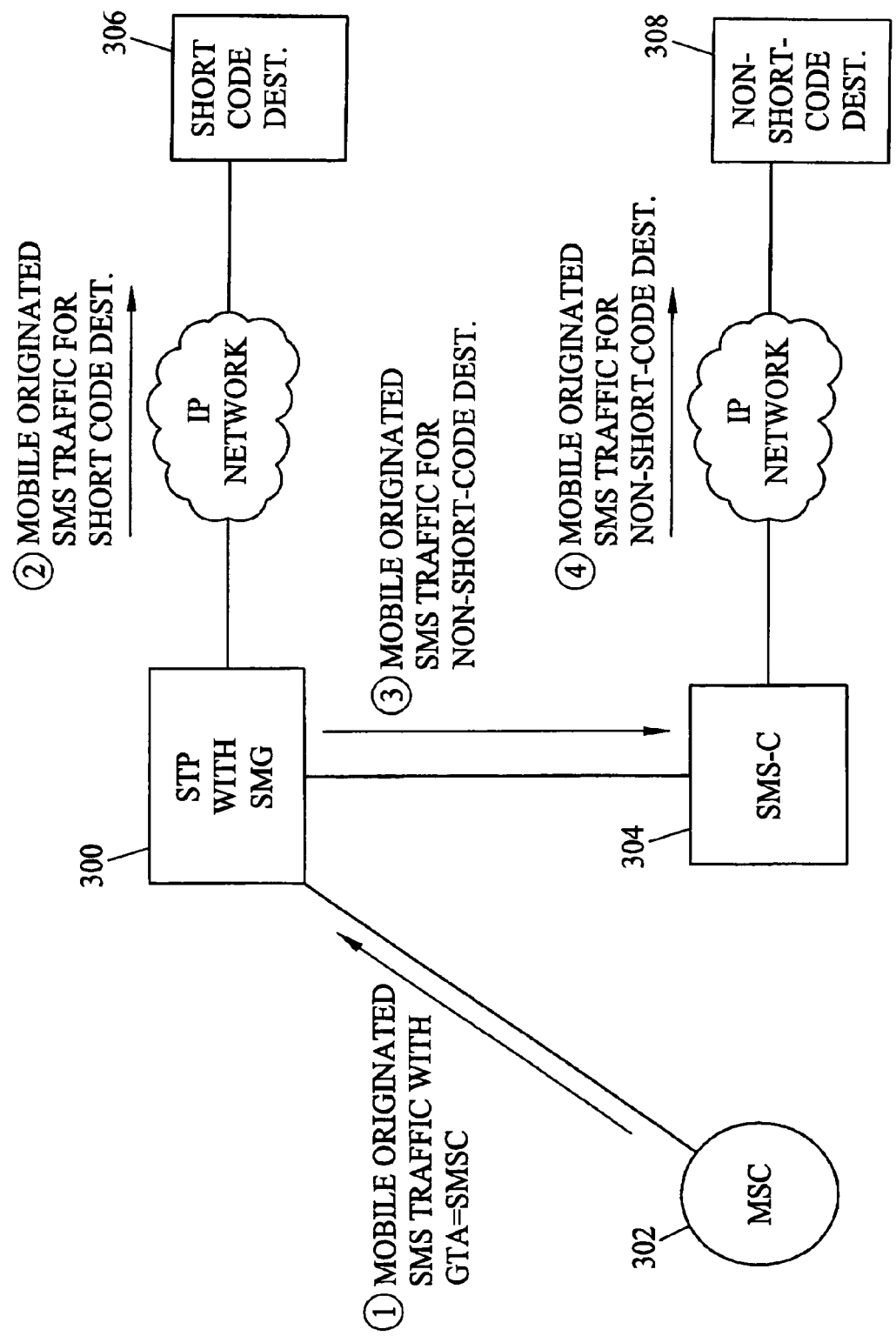
FIG. 3 is a network diagram illustrating the bypassing of the SMSC for SMS messages destined for predetermined SMPP destinations according to an embodiment of the present invention.

According to one aspect, the present invention includes an STP with a short message gateway that bypasses a short message service center for SMS messages destined for predetermined SMPP destinations. Referring to FIG. 3, the exemplary network includes an STP with a short message gateway 300, a mobile switching center 302, a short message service center 304, and SMPP destinations 306 and 308. In the illustrated example, SMPP destination 306 is assumed to be a short code destination, and SMPP destination 308 is assumed to be a non-short-code destination.

Figure 1:
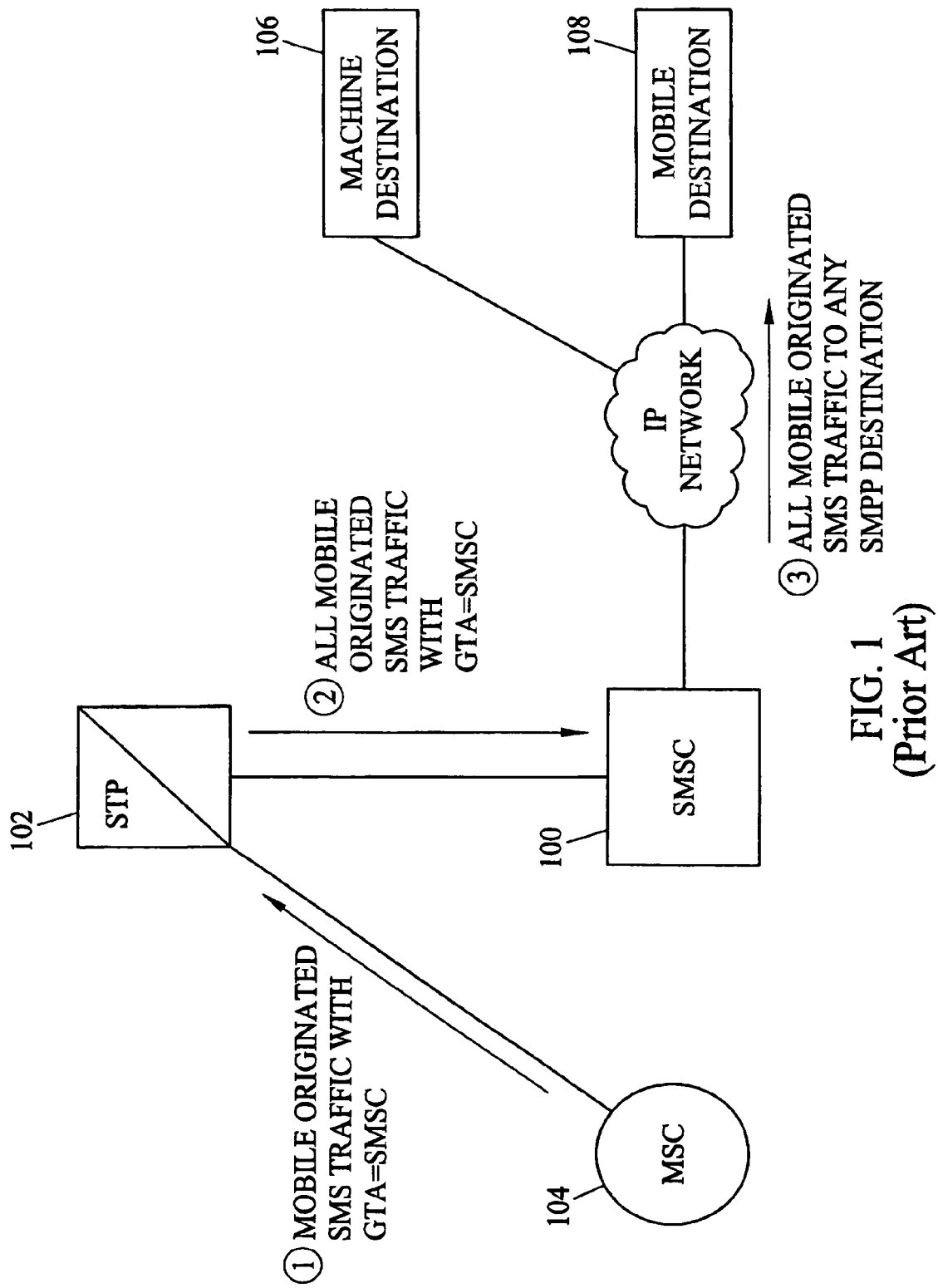
FIG. 1 is a network diagram illustrating conventional SMS message routing.
Figure 2:
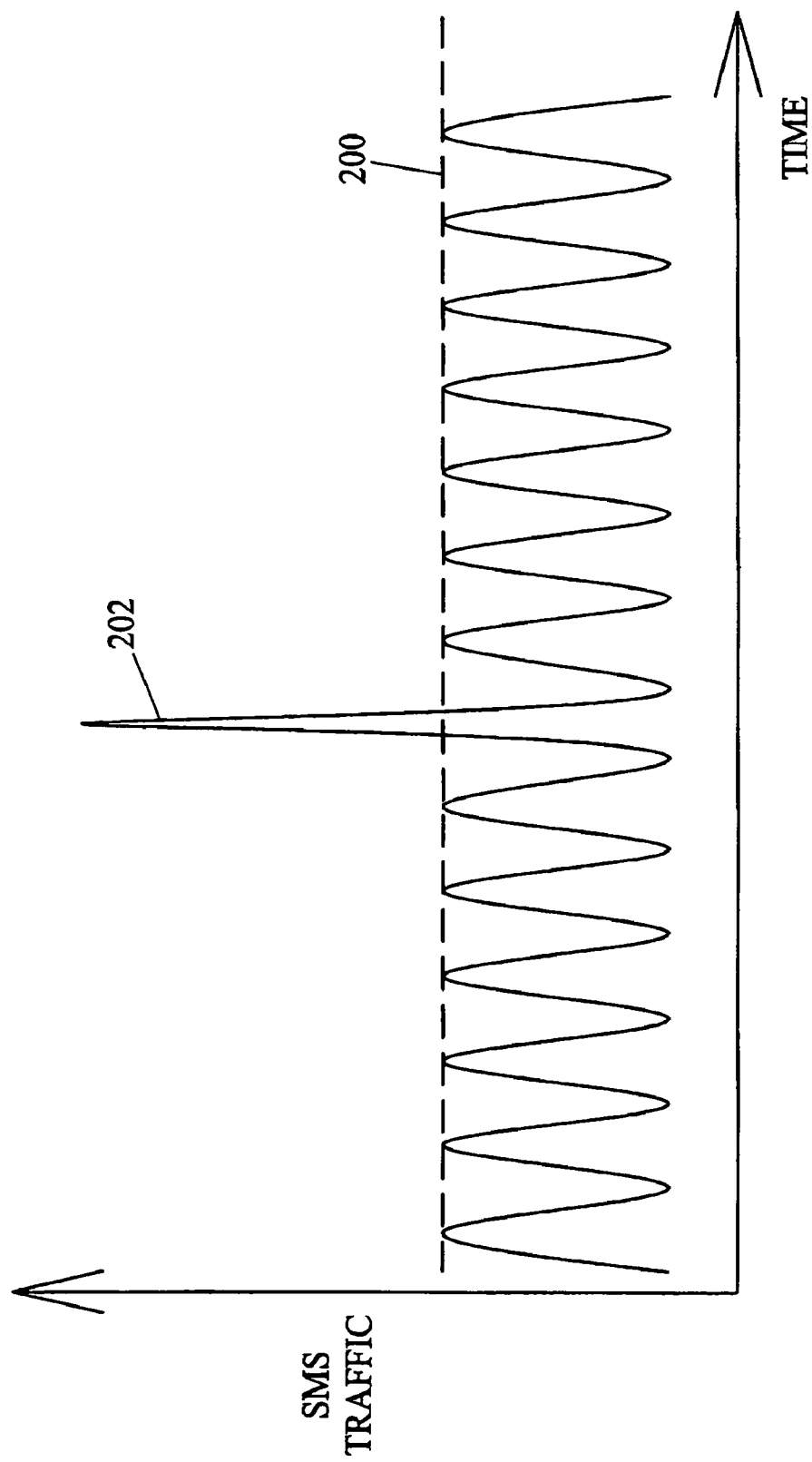
FIG. 2 is a graph illustrating SMS traffic versus time in a mobile communications network.

Similar to the example illustrated in FIG. 1, MSC 302 forwards mobile originated SMS traffic to STP 300. The global title address in the mobile originated SMS traffic is set to that of SMSC 304. STP 300 global title translates the messages such that the messages are routed to an internal short message gateway within STP 300, rather than SMSC 304. The short message gateway within STP 300 identifies messages that can be delivered without the services of an SMSC and forwards such messages to their SMPP destinations without impacting SMSC 304. Examples of such messages include messages addressed to stationary destinations that are always on, such as machine-based short code destinations. For other SMS messages, such as mobile terminated SMS messages, the short message gateway may formulate SMPP messages, forward these messages to SMSC 304, and SMSC 304 may undertake the steps to deliver such messages.

Figure 4:
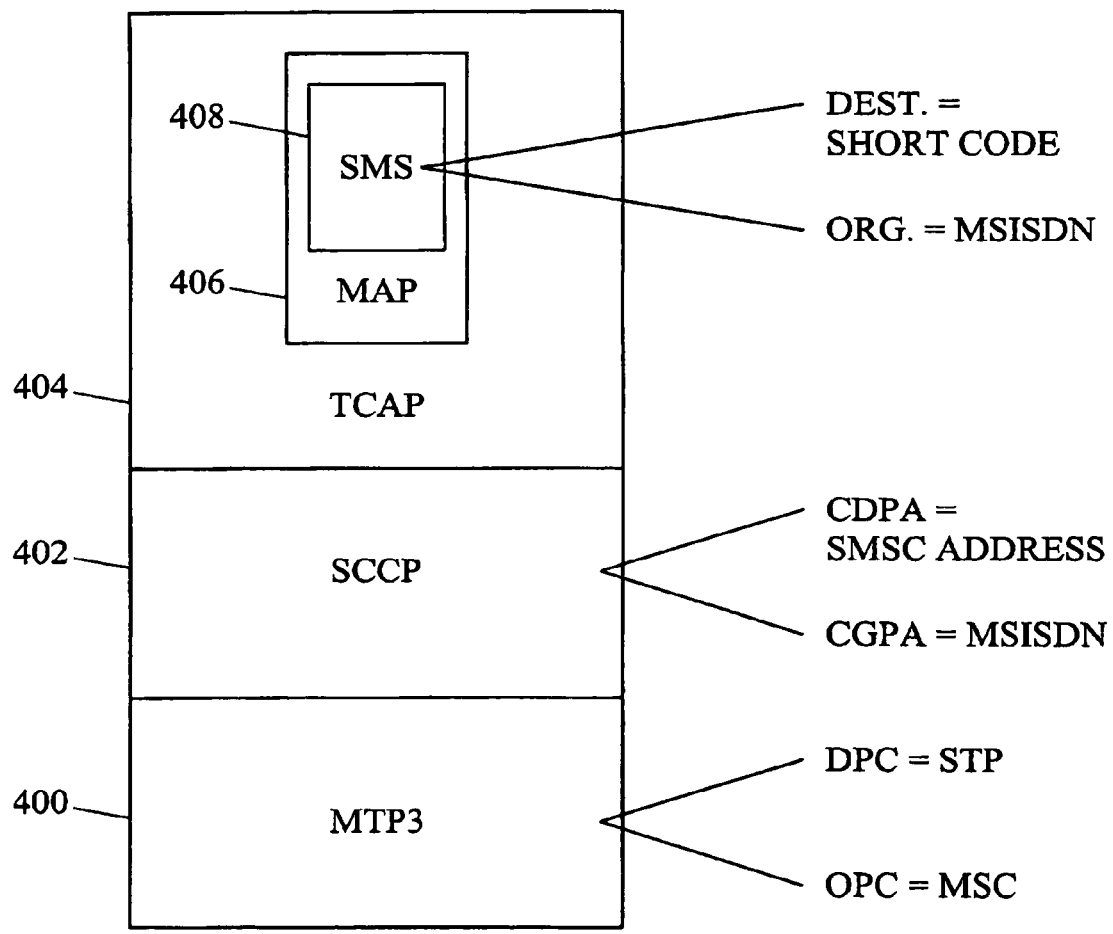
FIG. 4 is a block diagram of an SS7-based SMS message that may be processed by an STP with a short message gateway according to an embodiment of the present invention.

FIG. 4 is a block diagram illustrating an exemplary SS7-based SMS message that may be received by STP 300 illustrated in FIG. 3. In FIG. 4, the SS7-based SMS message is carried in an SS7 signaling message that includes a message transfer part level 3 (MTP3) layer 400, a signaling connection control part (SCCP) layer 402, and a transaction capabilities application part (TCAP) layer 404. TCAP layer 404 includes MAP information 406 and SMS information 408. For SS7 signaling messages that carry SMS messages, the MTP3 destination point code (DPC) would be set to that of STP 300. The originating point code would be set to the point code of MSC 302. In the SCCP layer of the message, the called party address (CDPA) is set to the address of short message service center 304. As stated above, the address of SMSC 304 is programmed into mobile handsets associated with the same service provider as SMSC 304 and sent automatically with SMS messages that a mobile subscriber originates. The calling party address in the SCCP message may be set to the MSISDN number of the calling mobile subscriber. In MAP portion 406, the parameters would be set to the appropriate message type for originating a short message. For example, the MAP opcode may be set to indicate that the MAP message is a MAP mobile originated forward short message message. In SMS portion 408, the SMS destination is assumed to be set to a short code in this example and the origination address is set to the MSISDN number of the sending subscriber. For messages that are not addressed to short codes, the SMS destination would be set to the directory number corresponding to the intended destination.

Figure 5:
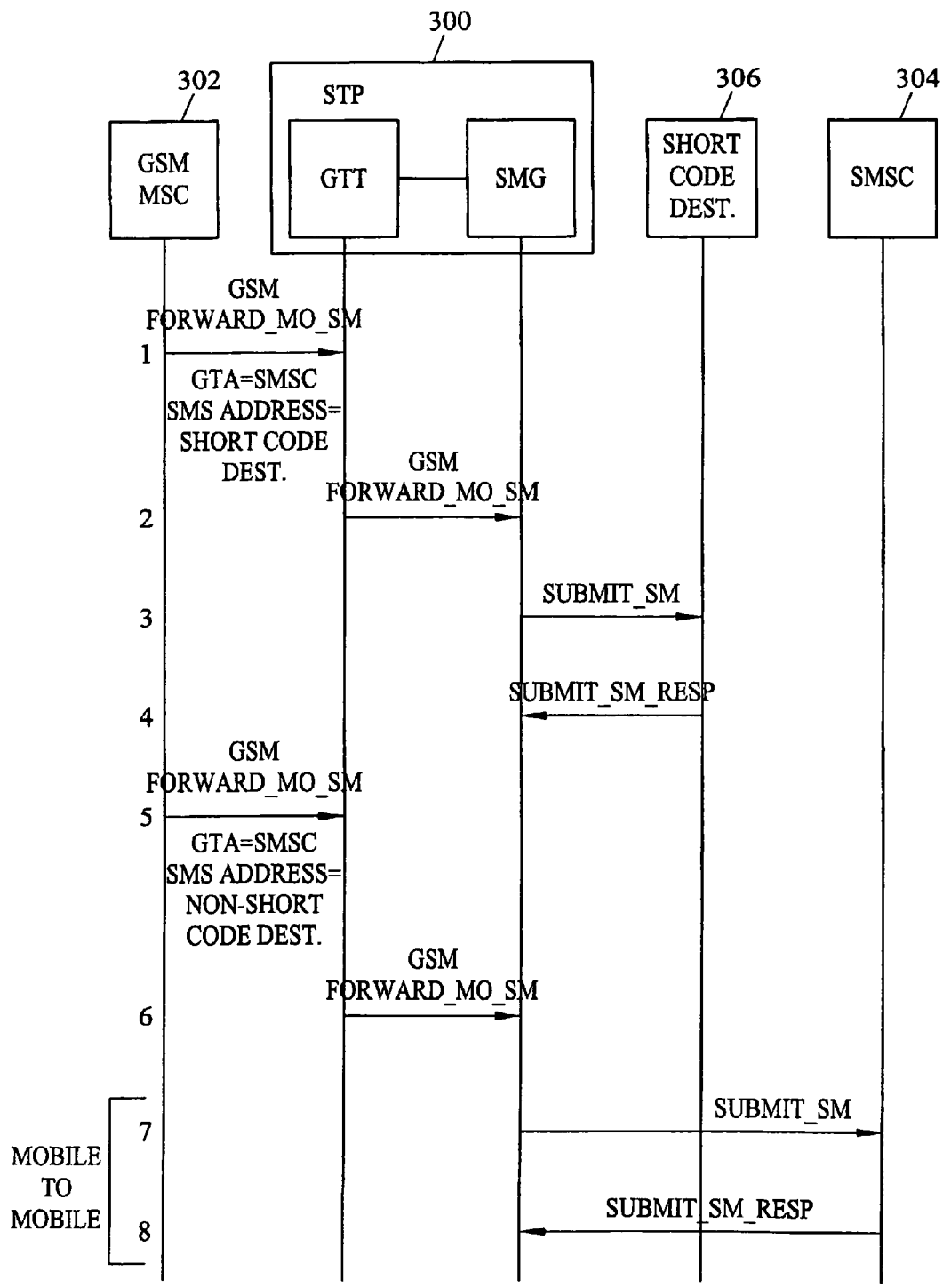
FIG. 5 is a message flow diagram illustrating exemplary signaling messages for bypassing an SMSC for SMS messages destined for predetermined SMPP destinations according to an embodiment of the present invention.

Using normal SS7 routing rules, a message that is addressed such as the message illustrated in FIG. 4 would be sent to SMSC 304 and delivered by SMSC 304. According to the present invention, STP 300 intercepts such messages, identifies the messages being addressed to short code destinations, and delivers the SMS text to the intended recipient via the SMPP protocol. FIG. 5 is a message flow diagram illustrating exemplary messages that may be exchanged between the network entities in FIG. 3 in delivering short-code-based SMS messages and non-short-code-based SMS messages according to an embodiment of the present invention. In the example illustrated in FIG. 5, MSC 302 is assumed to be a GSM MSC. However, the present invention is not limited to processing GSM based SMS messages. STP 300 may also process IS-41-based SMS messages or any other type of SS7-based or IP-telephony-based SMS messages without departing from the scope of the invention.

In FIG. 5, in line 1 of the message flow, GSM MSC 302 sends a GSM forward_MO_SM message to STP 300. The global title address in the message is assumed to be that of MSC 304. The SMS destination address is assumed to be set to the short code corresponding to short code destination 306. In line 2 of the message flow, STP 300 global title translates the message such that the message is now addressed to the internal point code assigned to the short message gateway within STP 300. Accordingly, STP 300 forwards the message to the short message gateway. In line 3 of the message flow, the short message gateway identifies the message as being addressed to a short code destination and formulates an SMPP submit_SM message to short code destination 306. In line 4 of the message flow, short code destination 306 formulates a submit_SM_RESP message and sends that message back to the message gateway. Thus, in lines 1–4 of the message flow, messages addressed to short codes are identified and routed to the short code destination without impacting SMSC 304.

In line 5 of the message flow, GSM MSC 302 sends a GSM forward_MO_SM message to STP 300. The global title address in the message is set to that of SMSC 304. However, the SMS destination address in the message is set to a non-short code destination. In Line 6 of the message flow, STP 300 intercepts the message and routes the message to its internal short message gateway in a similar manner to that described above with respect to line 2 of the message flow. In line 7 of the message flow, the short message gateway identifies the SMS message as being directed to a non-short-code destination and formulates and sends an SMPP submit_SM message to SMSC 304. In line 8 of the message flow, SMSC 304 sends a submit_SM response message back to the short message gateway in STP 300 indicating that the SMS message was successfully delivered to the SMPP destination. Thus, based on the message flow and processing steps illustrated in FIG. 5, certain SMS messages can be off-loaded from the SMSC while others are sent to the SMSC. The off-loaded messages may be messages that can be easily delivered or off-loaded without requiring full SMSC processing capacity.

Figure 6:
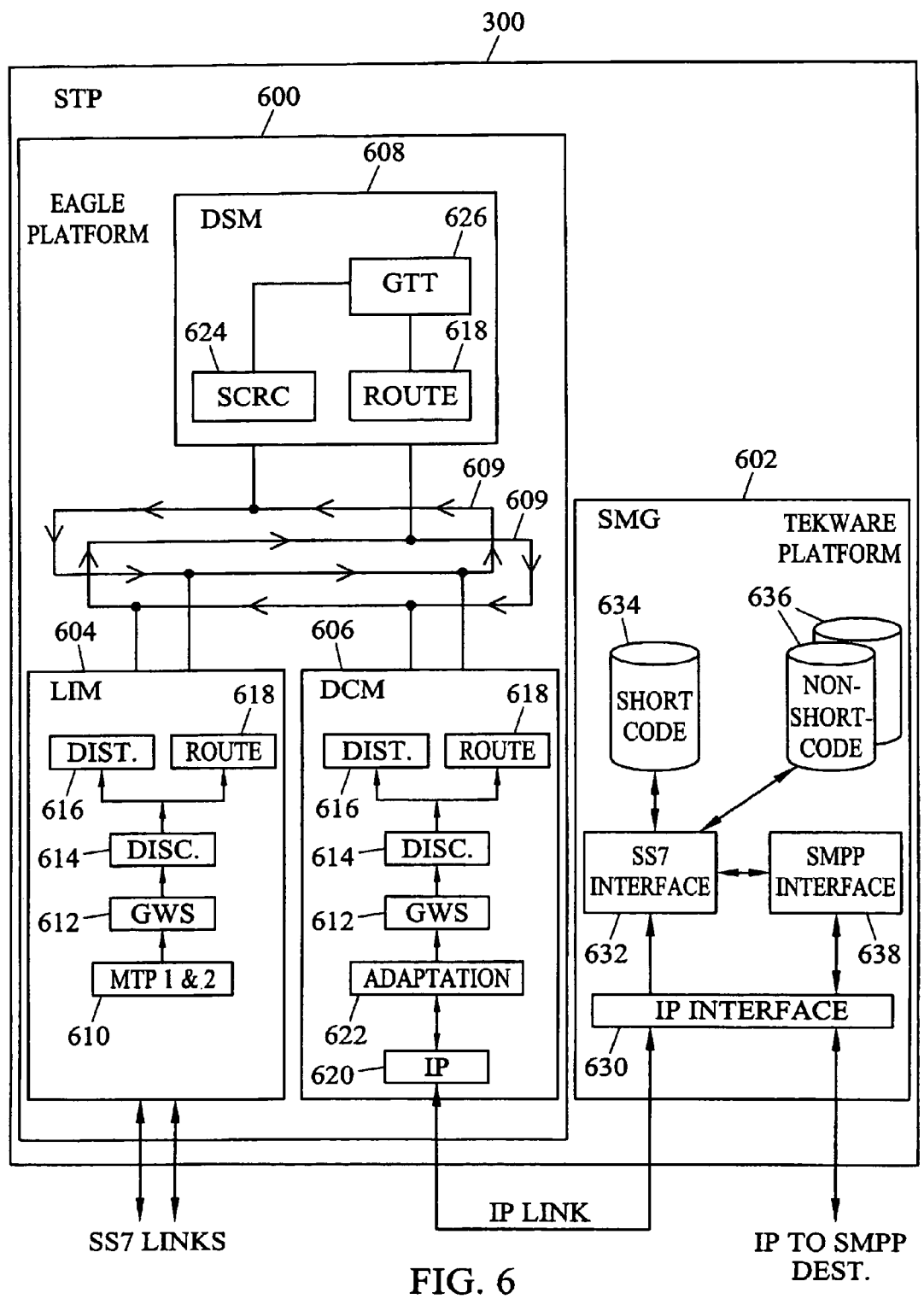
FIG. 6 is a block diagram illustrating an exemplary internal architecture for an STP with an internal short message gateway according to an embodiment of the present invention.

FIG. 6 is a block diagram of an exemplary internal architecture of an STP with an internal short message gateway according to an embodiment of the present invention. Referring to FIG. 6, STP 300 includes a first hardware platform 600 and a second hardware platform 602. Hardware platform 600 may be structured similarly to the Eagle® platform and platform 602 may be structured similarly to the Tekware™ platform, both available from Tekelec of Calabasas, Calif. In the illustrated example, platform 600 includes a plurality of communications modules connected to each other via an internal bus. These modules include a link interface module (LIM) 604, a data communications module (DCM) 606, and a database services module (DSM) 608. Each module may include an application processor for executing telecommunications applications and a communications processor for communicating with other modules via counter-rotating dual ring bus 609.

LIM 604 includes functionality for communicating with SS7 network elements via SS7 signaling links. In the illustrated example, these functions include an MTP level 1 and 2 function 610, a gateway screening function 612, a discrimination function 614, a distribution function 616, and a routing function 618. MTP level 1 and 2 function 610 performs the operations necessary to send and receive data over physical signaling links. These operations include modulation and de-modulation of electrical signals, message sequencing, error detection, and error correction. Gateway screening function 612 screens incoming messages based on the OPC and/or DPC to determine whether to allow the messages in the network. Discrimination function 614 passes messages that are to be through-switched to routing function 618. Discrimination function 614 passes messages that require internal processing to distribution function 616. Routing function 618 routes messages to the communications module associated with the outbound signaling link. Distribution function 616 distributes messages to an internal processing module for further processing.

DCM 606 includes similar SS7 functionality to LIM 604. Hence, a description of this functionality will not be repeated. In addition, DCM 606 includes an IP layer 620 and an adaptation layer 622. IP layer 620 performs functions for sending and receiving SS7 messages over IP signaling links. Adaptation layer 622 performs functions for adapting SS7 signaling protocols to be transmitted over IP protocols. IP layer 620 may also communicate with a corresponding IP layer in short message gateway 602.

DSM 608 includes functions for providing database related services for received signaling messages. In the illustrated example, these functions include a signaling connection routing controller (SCRC) 624 for determining the type of database service required by received message, a global title translation function 626 for performing global title translation for received signaling message, and a routing function 618 for routing messages after a database translation has been performed.

Short message gateway 602 may be coupled to platform 600 via an IP link with DCM 606. Accordingly, short message gateway 602 preferably includes an IP interface 630. In addition, short message gateway 602 preferably includes an SS7 interface 632 for decoding SS7 messages and extracting SMS destination address information from the messages. For messages that contain short codes, SS7 interface 632 may perform a lookup in short code database 634. For SS7 messages that do not include short codes, SS7 interface 632 may perform a lookup in one of a plurality of different non-short-code databases 636. Examples of such databases may include NPA-NXX directory number (DN) translation databases, international DN translation databases, and e-mail address translation databases. Short message gateway 602 preferably also includes an SMPP interface 638 for formulating, sending, and receiving SMPP messages.

The present invention is not limited to a short message gateway that is located on a separate processing platform from the link interface and database service modules. In an alternate embodiment of the invention, the short message gateway may be implemented on a printed circuit board, such as a DSM, that is located in the same platform as the LIMs, DCMs, and other DSMs.

Figure 7:
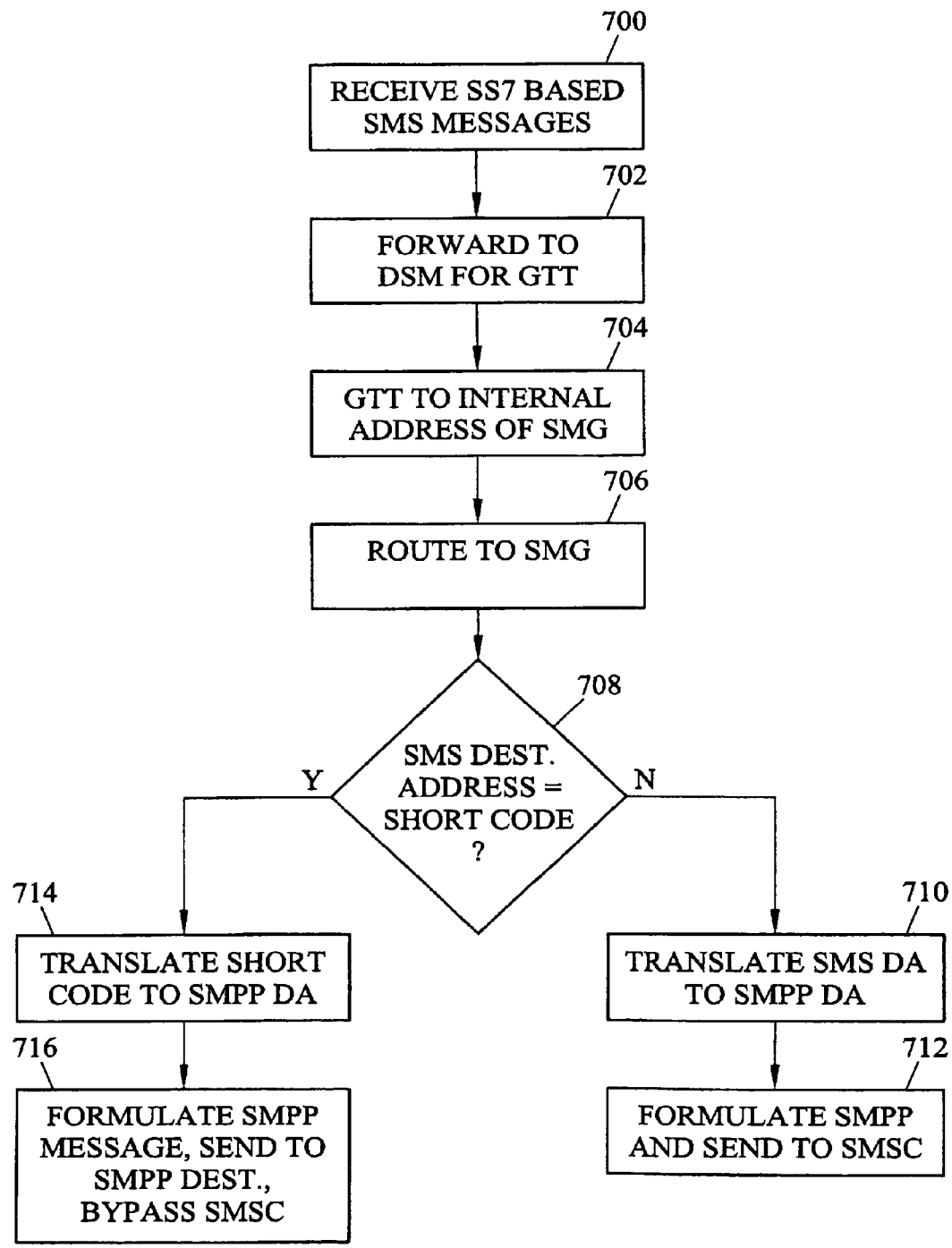
FIG. 7 is a flow chart illustrating exemplary steps that may be performed by an STP with an internal short message gateway in bypassing an SMSC for SMS messages directed to predetermined SMPP destinations according to an embodiment of the present invention.

FIG. 7 is a flow chart illustrating exemplary steps that may be performed by STP 300 in processing SMS messages according to an embodiment of the present invention. Referring to FIG. 7, in step 700, STP 300 receives SS7-based SMS messages. For example, the messages may be received by link interface module 604. In step 702, link interface module 604 identifies the messages as being destined to the point code of STP 300. LIM 604 forwards the messages to DSM 608. In step 704, DSM 608 performs global title translation for the SMS messages. The global title translation results in a point code corresponding to short message gateway 602. In step 706, DSM 608 forwards the messages to short message gateway 602. This forwarding may be performed by routing the messages over bus 609 to DCM 606. DCM 606 may encapsulate the messages in IP datagrams and forward the messages to short message gateway 602 via an IP signaling link.

In step 708, SS7 interface 632 in short message gateway 602 determines whether the SMS destination address is equal to a short code. If the address is not equal to a short code, control proceeds to step 710 where the SMS destination address is translated to an SMPP destination address. Control then proceeds to step 712 where SMPP interface 638 formulates an SMPP message and sends the message to a short message service center for delivery.

In step 708, if the message is determined to be addressed to a short code, control proceeds to step 714 where the short code is translated into an SMPP destination address. In step 716, the SMPP interface 638 formulates an SMPP message and sends the message to an SMPP destination, bypassing the SMSC.

Figure 8:
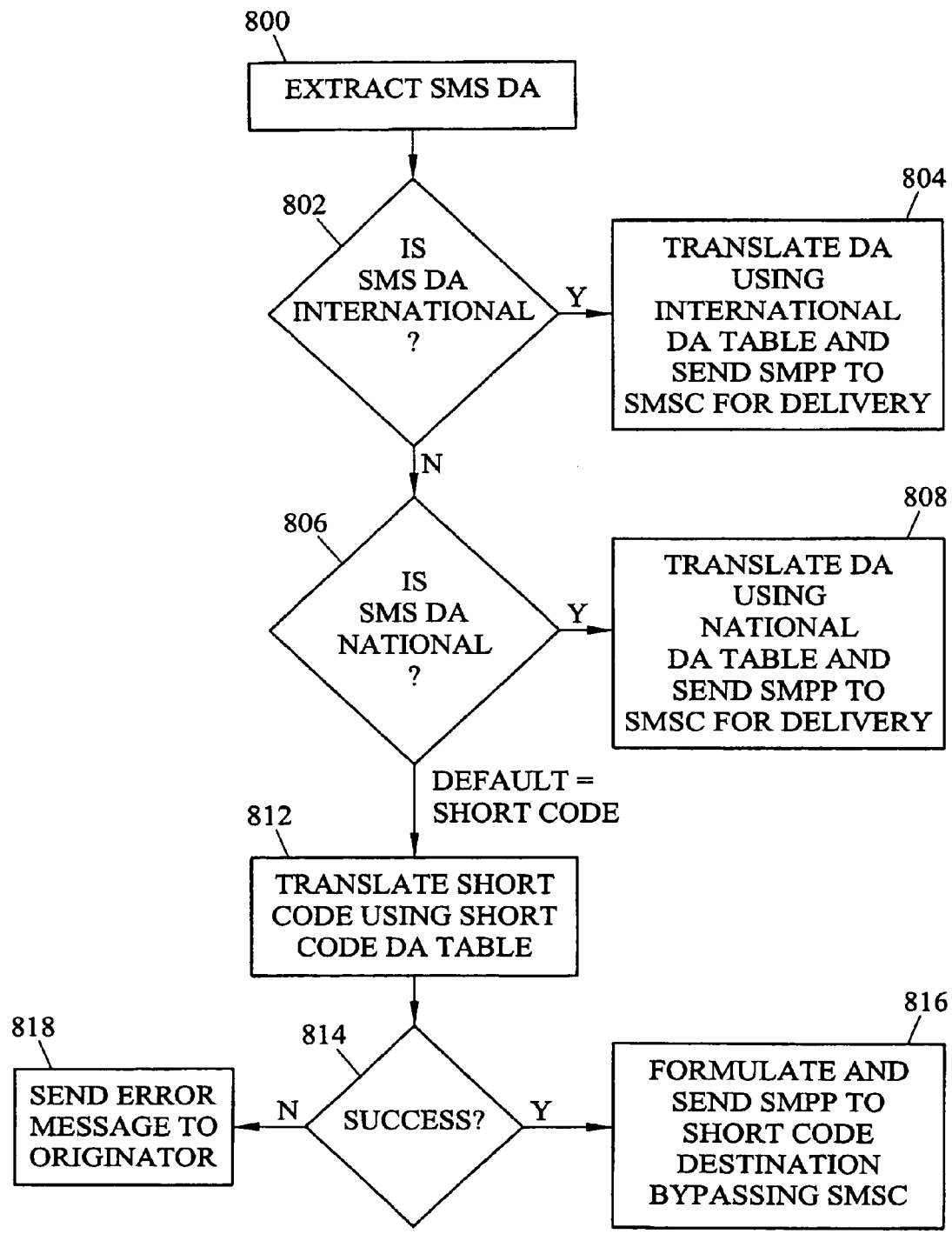
FIG. 8 is a flow chart illustrating exemplary steps that may be performed by an STP with an internal short message gateway in identifying and processing SMS messages addressed to short codes according to an embodiment of the present invention.

FIG. 8 is a flow chart illustrating exemplary steps that may be performed by the short message gateway in identifying messages addressed to short codes. Referring to FIG. 8, in step 800, SS7 interface 632 of short message gateway 602 extracts an SMS destination address from the message. In step 802, SS7 interface 632 determines whether the destination address in the message is international. This step may be performed by determining whether the SMS destination address includes a 011 or other international prefix. If the message is international, control proceeds to step 804 where the SMS destination address is translated using an international destination address table. An SMPP message is then sent to the SMSC for delivery.

If, in step 802, the SMS destination address is determined not to be international, control proceeds to step 806 where it is determined whether the SMS destination address is addressed to a national numbering plan destination address. This step may include determining whether the destination address is in NPA-NXX format, for North American numbering plan destinations. If the message is addressed to a national numbering plan destination, control proceeds to step 808 where the SMS destination address is translated into an SMPP address. An SMPP message is then formulated and sent to the SMSC for delivery.

If, in step 806, the SMS message is determined not to be a national destination address, the SMS destination address is assumed to be a short code by default. In this case, control proceeds to step 808 where the short code is translated into an SMPP address using the short code destination address table. In step 814 it is determined whether or not the translation was successful. If the translation was successful, control proceeds to step 816 where an SMPP message is formulated and sent to the SMPP destination, bypassing the SMSC. If the translation was not successful, the message is assumed to be invalid and an error message is sent to the originator.

Thus, using the steps illustrated in FIGS. 7 and 8, the present invention differentiates between SMS messages addressed to predetermined SMPP destinations. Certain messages are sent to the SMPP destinations without impacting the SMSC. Other messages are sent to the SMSC for delivery. Because certain SMS messages bypass the SMSC, the need to over-engineer SMSC resources in the network is reduced.

As stated above, the present invention is not limited to only off-loading short code traffic from SMSC processing. Off-loading any suitable type of processing can be performed by structuring the appropriate tables in short message gateway 602. For example, short message gateway 602 can be modified to include store and forward capabilities and HLR query capabilities, similar to that of an SMSC. In such a situation, short message gateway 602 can deliver mobile-terminated SMS messages without impacting the SMSC. In addition, for mobile-originated SMS messages, short message gateway 602 may off-load any type of messages that do not require store and forward processing, such as those addressed to stationary destinations that are always on.

Although the examples above relate to SS7-based SMS messages being forwarded to the STP and the SMS gateway, the subject matter described herein is not limited to these examples. In alternate implementation, the SMS messages may be carried in IP telephony signaling messages, such as a SIP MESSAGE message or a SIP INVITE message, or other suitable IP telephony signaling message capable of carrying an SMS message. In such an implementation, the STP may analyze the digits in the To header of the SIP message to determine whether the SMS message is addressed to a short code or other immediate delivery destination as described above. If the message is addressed to a short code or other immediate delivery destination, the SMS message may be forwarded to the destination in a matter that bypasses the SMSC. As described above, forwarding the SMS message to the destination may include formulating a SMPP message that includes the SMS message. If the SMS message is not addressed to a machine destination, the SMS message may be forwarded to the SMSC for store and forward delivery, as described above.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for bypassing a short message service center for short message service messages to predetermined destinations, the method comprising:
    (a) receiving short message service (SMS) message traffic that is global title addressed to a short message service center (SMSC);
    (b) identifying first SMS messages of the SMS traffic that are destined for a predetermined short message peer-to-peer (SMPP) destination;

(c) routing the first messages to the predetermined SMPP destination in a manner that bypasses the SMSC;

(d) identifying second SMS messages of the SMS traffic that are not destined for the predetermined SMPP destination; and (e) routing the second SMS messages to the SMSC.

2. The method of claim 1 wherein receiving SMS traffic includes receiving mobile-originated SMS traffic and mobile-terminated SMS traffic, wherein identifying and routing the first SMS messages to the SMPP destination in a manner that bypasses the SMSC includes routing the mobile-originated SMS traffic to the predetermined SMPP destination in a manner that bypasses the SMSC, and wherein identifying and routing the second SMS messages to the SMSC includes routing the mobile-terminated SMS messages to the SMSC.

3. The method of claim 1 wherein receiving SMS traffic includes receiving SS7-based SMS traffic and wherein routing the first SMS messages to the SMPP destination includes formulating SMPP-based SMS messages based on the SS7-based SMS messages.

4. The method of claim 1 wherein receiving SMS traffic includes receiving SIP-based SMS traffic and wherein routing the first SMS messages to the predetermined SMPP destination includes formulating SMPP-based SMS messages based on the SIP-based SMS messages.

5. The method of claim 1 wherein receiving SMS message traffic includes receiving SMS message traffic destined for a machine destination and SMS message traffic destined for non-machine destinations, wherein identifying first SMS messages destined for the predetermined SMPP destination includes identifying SMS messages destined for the machine destination, and wherein identifying SMS messages that are not destined for the predetermined SMPP destination includes identifying SMS messages destined for non-machine destinations.

6. The method of claim 5 wherein routing the first SMS messages to the predetermined SMPP destination includes routing the messages that are destined for the machine destination to the machine destination and wherein routing the second SMS messages to the SMSC includes routing the SMS destined for non-machine destinations to the SMSC.

7. The method of claim 6 wherein routing the SMS messages destined for the machine destination to the machine destination includes bypassing the SMSC.

8. The method of claim 7 wherein the machine destination comprises a voting application.

9. The method of claim 1 wherein receiving SMS message traffic includes receiving SMS message traffic destined for a short code destination and message traffic destined for a non-short-code destination, wherein identifying first SMS messages destined for the predetermined SMPP destination includes identifying SMS traffic destined for the short code destination, and wherein identifying second SMS messages that are not destined for the short code destination includes identifying SMS messages that are not destined for the short code destination.

10. The method of claim 9 wherein routing the first SMS messages to the predetermined SMPP destination includes routing the SMS traffic destined for the short code destination to the short code destination and wherein routing the second SMS traffic to the second SMPP destination includes routing the SMS messages that are not addressed to the short code destination to the SMSC.

11. The method of claim 10 wherein routing the first SMS messages to the short code destination includes bypassing the SMSC.

12. The method of claim 1 wherein receiving SMS message traffic includes receiving SMS message traffic for immediate delivery and SMS traffic for non-immediate delivery, wherein identifying first SMS messages destined for the predetermined SMPP destination includes identifying the SMS traffic for immediate delivery, and wherein identifying second SMS messages that are not destined for the predetermined SMPP destination includes identifying the SMS message traffic for non-immediate delivery.

13. The method of claim 12 wherein routing the first SMS messages to the predetermined SMPP destination includes routing the SMS traffic for immediate delivery to the SMPP destination and wherein routing the second SMS messages to the SMSC includes routing the SMS traffic for non-immediate delivery to the SMSC.

14. The method of claim 13 wherein routing the SMS traffic for immediate delivery to the SMPP destination includes bypassing the SMSC.

15. The method of claim 1 comprising, for the SMS message traffic received in step (a), translating an SMSC global title address in each of the messages of the SMS message traffic into a point code and subsystem number associated with a short message gateway distinct from the SMSC, wherein steps (b)–(e) are performed at the short message gateway.

16. A method for screening short message service (SMS) message directed to short codes, the method comprising:

(a) receiving a plurality of SMS messages and determining whether the messages are destined for international short message peer-to-peer (SMPP) destinations;

(b) in response to determining that the messages are not destined for international SMPP destinations, determining whether the messages are destined for national numbering plan SMPP destinations; and (c) in response to determining that the messages are not destined for national numbering plan SMPP destinations, assuming that the messages are destined for short code destinations and performing lookups in a short code translation database for determining SMPP destination addresses for the messages.

17. The method of claim 16 wherein steps (a)–(c) are performed at a signal transfer point.

18. The method of claim 16 wherein steps (a)–(c) are performed at a short message gateway distinct from a short message service center.

19. The method of claim 16 wherein steps (a)–(c) are performed at a short message service center.

20. The method of claim 16 comprising, in response to failing to locate an SMPP destination address for a message assumed to be destined for a short code destination, discarding the message and sending an error message to a sending node.

21. A signal transfer point including a short message gateway for bypassing a short message service center for predetermined sort message service (SMS) traffic, the signal transfer point comprising:

(a) a link interface module for sending and receiving signaling messages via signaling signaling links and for identifying signaling messages as requiring further processing by the signal transfer point;

(b) a global title translation function for receiving the signaling messages identified as requiring further processing and for global title translating and routing signaling messages that include SMS messages and that are addressed to a short message service center to a short message gateway; and (c) a short message gateway operatively associated with the global title translation function for identifying first SMS messages destined for predetermined short message peer-to-peer (SMPP) destinations and for routing the first SMS messages to the predetermined SMPP destinations in a manner that bypasses the SMSC and for identifying second SMS messages that are not destined for the predetermined SMPP destinations and for routing the second SMS messages to the SMSC.

22. The signal transfer point of claim 21 wherein the link interface module comprises an SS7 link interface module for performing SS7 message transfer part level 3 (MTP3) routing functions.

23. The signal transfer point of claim 21 wherein the link interface module comprises an IP link interface module for sending and receiving IP telephony signaling messages.

24. The signal transfer point of claim 21 wherein the first SMS messages include messages addressed to a machine destination and the second SMS messages include messages that are addressed to non-machine destinations.

25. The signal transfer point of claim 21 wherein the first SMS messages include messages addressed to a short code destination and wherein the second SMS messages include messages that are addressed to a non-short-code destination.

26. The signal transfer point of clam 21 wherein the first SMS messages include messages for immediate delivery and the second SMS messages include messages for non-immediate delivery.

27. The signal transfer point of claim 21 wherein the short message gateway is adapted to identify messages destined for short codes by default in response to determining that the messages do not include international or national numbering plan addresses.

28. The signal transfer point of claim 21 wherein the short message gateway is adapted to formulate SMPP-based SMS messages based on received SS7-based SMS messages.

29. The signaling transfer point of claim 21 wherein the link interface module, the global title translation function, and the short message gateway are implemented in the same processing platform.

30. The signal transfer point of claim 21 wherein the link interface module and the global title translation function are implemented in a first processing platform and the short message gateway implemented in a second processing platform coupled to the first processing platform.

* * * * *